UNITED STATES PATENT OFFICE.

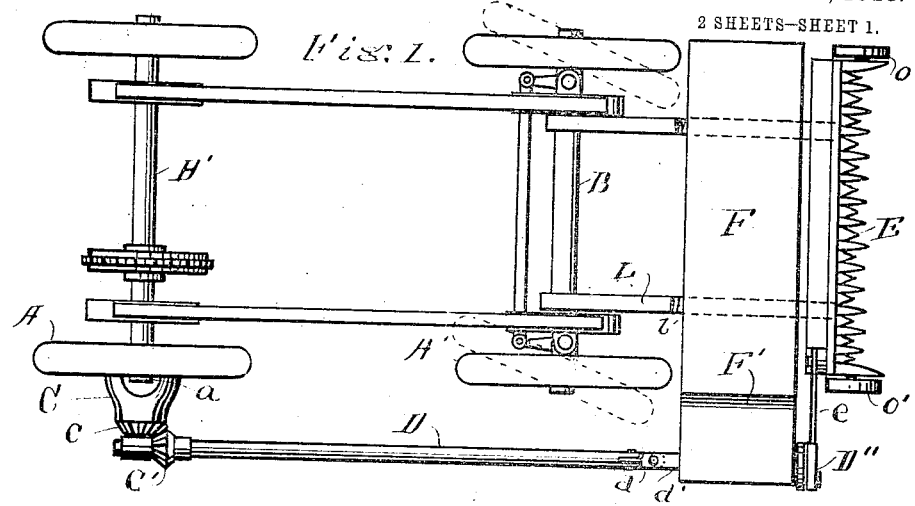
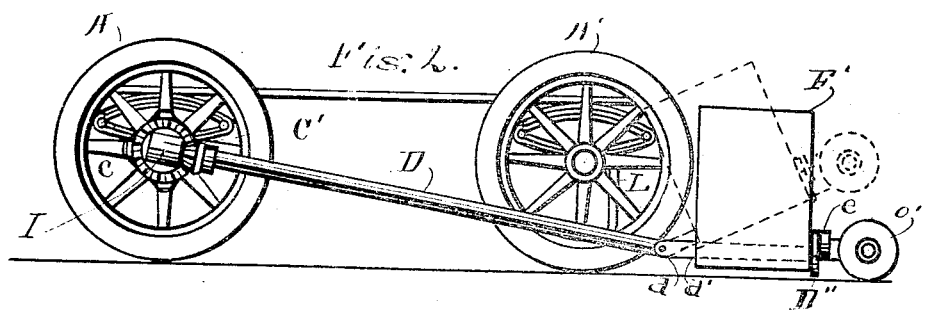
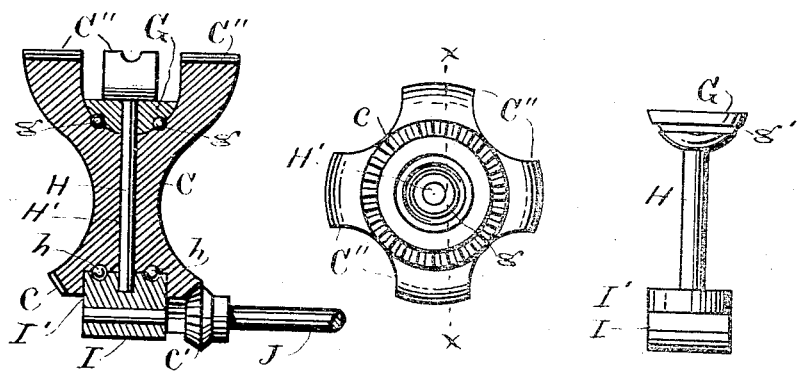

WALTER BURLING, OF GRAND RAPIDS, MICHIGAN.

MOWER.

1,053,901.

Specification of Letters Patent.

Patented Feb. 18, 1913.

Application filed June 1, 1911. Serial No. 630,725.

*To all whom it may concern:*

Be it known that I, WALTER BURLING, a citizen of the United States, residing at Grand Rapids, in the county of Kent and State of Michigan, have invented certain new and useful Improvements in Mowers, of which the following is a specification.

My invention relates to improvements in mowers, reapers and binders, and its object is to provide a means whereby an ordinary automobile may be utilized for driving the mower &c. I attain this object by the mechanism illustrated in the accompanying drawing, in which—

Figure 6:
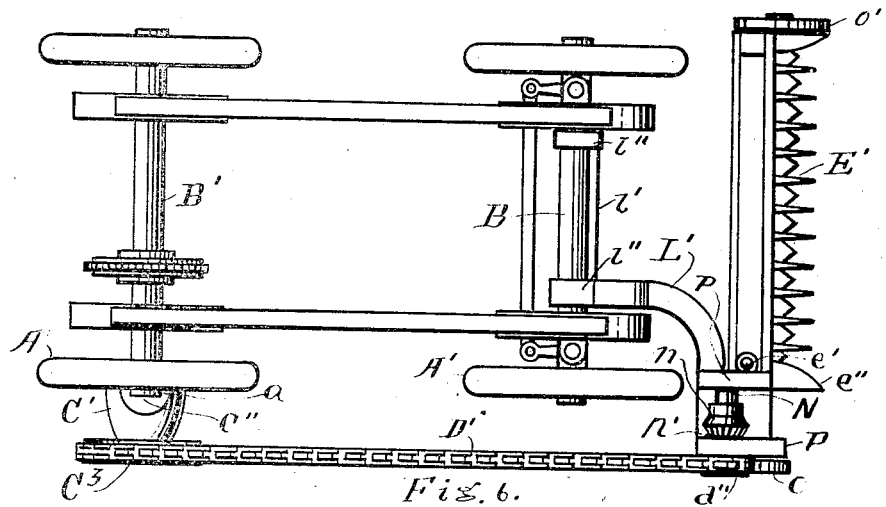
Figure 7:
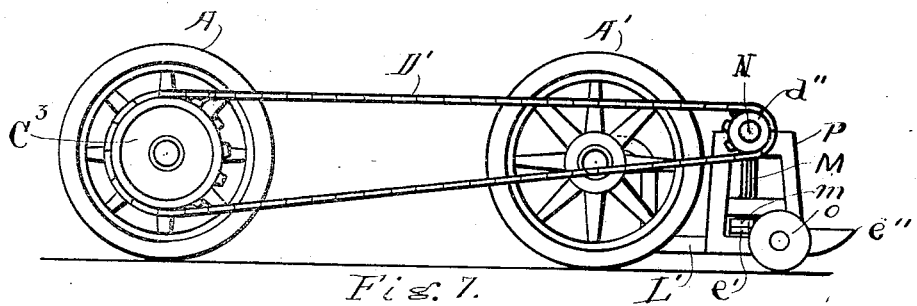
Figure 8:
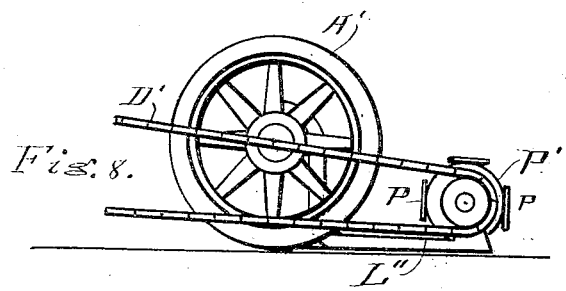

Figure 1 is a plan of the running gear of an ordinary automobile showing the cutting bar and the bed of a reaper and binder attached. Fig. 2 is a side elevation of the same. Fig. 3 is a sectional plan of the appliance with which the power is transmitted from the automobile wheel to the cutting bar of the mower, on the line $x$ $x$ of Fig. 4. Fig. 4 is an end elevation of the same showing a bevel gear for driving the shaft shown in Figs. 1 and 2. Fig. 5 is a plan of the shaft and bearings for supporting the end of the driving shaft shown in Figs. 1 and 2. Fig. 6 is a plan of the running gear of an automobile showing a plain mowing machine finger bars and cutters attached, and a modified form of transmission. Fig. 7 is an elevation of the same. Fig. 8 indicates an ordinary rotary lawn mower attachment, with the caster wheel removed.

Similar letters refer to similar parts throughout the several views.

The germ of my invention lies, principally, in the manner of attaching the ordinary finger bars and cutters of a mowing or reaping machine to an automobile, and of transmitting motion and power from the hind axletree of an ordinary automobile, whether a touring car, a run-around or an ordinary truck car.

In Figs. 1 and 2 I have shown the cutter bar E and platform F F' of a reaper or binder secured to the front axletree B of an automobile, by means of supporting arms L L, and in this application I find it possible to use two of these arms as none of the grain is supposed to be spread upon the ground back of the cutter bar. The arms L L must be hinged, as at $l$ $l$, so that the cutter bar may be raised up from the ground, as indicated by the dotted lines in Fig. 2, to carry it over obstacles on the surface of the ground, or to elevate it sufficiently to use the machine for "heading" grain. $o'$ $o'$ represent caster wheels journaled at the ends of the cutter bar to support and carry the cutter bar when it is located near the ground and in operation.

I have shown two forms of transmission for carrying motion and power from the hind axletree B' to the cutter bar. In Figs. 1 and 2 I have shown a shaft, D, the back end of which is supported in a bearing I, and has a bevel gear $c'$ in position to mesh with the bevel gear $c$ on the end of the hub or arm C. The arm C is securely attached to the spokes of the wheel A, as indicated in Figs. 1 and 2 in such a manner that they must revolve when the wheel revolves, which, by reason of the meshing of the gear wheels $c$ and $c'$, causes the shaft D to revolve. The opposite end of this shaft is provided with a universal joint $d$ by means of which it is connected with the shaft $d'$ upon which the crank disk D'' is mounted for the purpose of actuating the connecting rod $e$ to transform the rotary motion of the shafts to a reciprocating motion at the cutter bar, in the usual manner. When the shaft D, with its bevel gear connection, is used it is necessary to provide some means of supporting the end of the shaft, and, at the same time allow the hub or arm C to revolve to transmit motion to the shaft, and, for this purpose, I pass a shaft H through a central opening H' in the arm C, as indicated in Fig. 3, and form a bearing I on one end that is fitted to receive the end of the shaft D and allow it to revolve freely. The hub I' of this bearing is passed into the end of the arm C and is provided with ball bearings, as indicated at $h$ $h$. The other end of this shaft has a bearing G that is, also, made to travel upon ball bearings, as indicated at $g$, so that the friction between the shaft H and the arm C is reduced to the minimum of resistance. $g'$, on Fig. 5, represents the groove in which the balls $g$ travel when the arm C is revolving, and C'' represents diverging legs on the arm C or C', by means of which the arm is secured to the wheel. These legs must diverge sufficiently so that they will not, in any way, interfere with the hub $a$ of the wheel. It is, of course, understood that the wheel A revolves with the hind axletree B' when the automobile is being driven, and the arms C or C' revolve with the wheel.

When the cutter bar, only, is used, as upon an ordinary mowing machine, it is necessary to leave the space back of the cutter bar E' clear so that the hay or straw may fall freely upon the ground as it is being cut, hence it is not possible to have two arms, L L, as shown in Fig. 1, and to overcome this difficulty I find the most feasible plan to be to form a curved arm, as L' in Fig. 6, that will carry the supporting element P beyond the wheel A', and to secure this firmly to place on the axletree B I make use of an integral body l' which lies directly under the axletree and is firmly secured to place by means of any available form of clamps, as indicated at l'' l'' in Fig. 6.

In Figs. 6 and 7 I have shown the use of a sprocket chain D' for transmitting motion and power from the arm C', which corresponds with the arm C in Fig. 1, to the cutter bar, and when this is used it is necessary to modify the transmitting element on the arm C' from a bevel gear, as shown at c in Figs. 1, 2 and 3, to a sprocket wheel, as shown at C³ in Figs. 6 and 7. The sprocket chain D' leads to a sprocket wheel d'', which is mounted on the shaft N, and the shaft N is provided with a bevel gear wheel n which is made to mesh with a corresponding gear wheel n' to cause the shaft M to revolve. A crank disk m is mounted on the lower end of this shaft and connected with the connecting rod e', which, in turn, is connected with the cutter bar E' for the purpose of converting the rotary motion of the shaft M to a reciprocating movement of the cutter bar E. o and o' represent the caster wheels that support the cutter bar as it travels over the surface of the ground when mowing grass, and e'' represents supporting shoe that is connected with the frame that carries the cutter bar.

In Fig. 8 I have shown an appliance wherewith an ordinary large rotary lawn mower, such as is used in extensive parks, may be utilized upon an automobile quite as successfully as the reaper or mower, hereinbefore described, may be used. In this view I have shown the sprocket chain transmitter, but do not, thereby, desire to imply that this is essential, as it is exactly as practical to apply the shaft transmitter shown in Figs. 1 and 2. In this connection it is necessary to support the mower P' much the same as the reaper attachments E, F, F' are supported; that is, by the use of two supporting arms, as L L, the equivalent of which I have shown at L'' in Fig. 8. In this figure p p represent the ends of the mower knives which are mounted upon the cylinder P', in the usual manner. I have left the caster wheel O off of this view so that I may be able to more clearly show the application of the mower to this line of work in connection with an automobile, or any other available form of propelling vehicle.

It is very necessary, in the combinations hereinbefore set forth, to carry the shaft D or the chain D', or any other transmission element between the wheel A and the cutting elements of the mowing machine far enough away from the wheels A and A' so that the wheel A' may turn freely, as indicated by the dotted lines in Fig. 1, for the purpose of turning the automobile around or out of the way of other passing vehicles, without any danger of its coming in contact with the shaft or chain, hence the necessity of placing the long arm C as stated.

What I claim as new, and desire to secure by Letters Patent of the United States, is:

1. In combination with an automobile having a front axletree and a back axletree with two front wheels mounted on the front axletree and two rear wheels mounted on the rear axletree, an arm centrally mounted upon one of the rear wheels, a cutter bar firmly supported from, and parallel with the front axletree, and means for actuating the cutter bar from the arm on the rear wheel.

2. In combination with an automobile having a front axletree and a rear axletree, two front wheels mounted on the front axletree and two rear wheels mounted on the rear axletree, an arm concentrically mounted on one of the rear wheels and having bevel gear teeth around the outer end, a cutter bar firmly supported from the front axletree, a shaft passing centrally through the arm longitudinally thereof, a bearing secured to the outer end of said shaft, a shaft journaled in said bearing and having a bevel gear wheel arranged to mesh with the gear teeth at the end of the arm, a universal joint connection near the end of said shaft with said end journaled to a support from the front axletree, and a crank thereon to transform the rotary motion of the wheel to a reciprocating motion at the cutter bar.

Signed at Grand Rapids Michigan May 27, 1911.

WALTER BURLING.

In presence of—
I. J. CILLEY,
CHAS. V. HILDING.